United States Patent Office 3,435,967
Patented Apr. 1, 1969

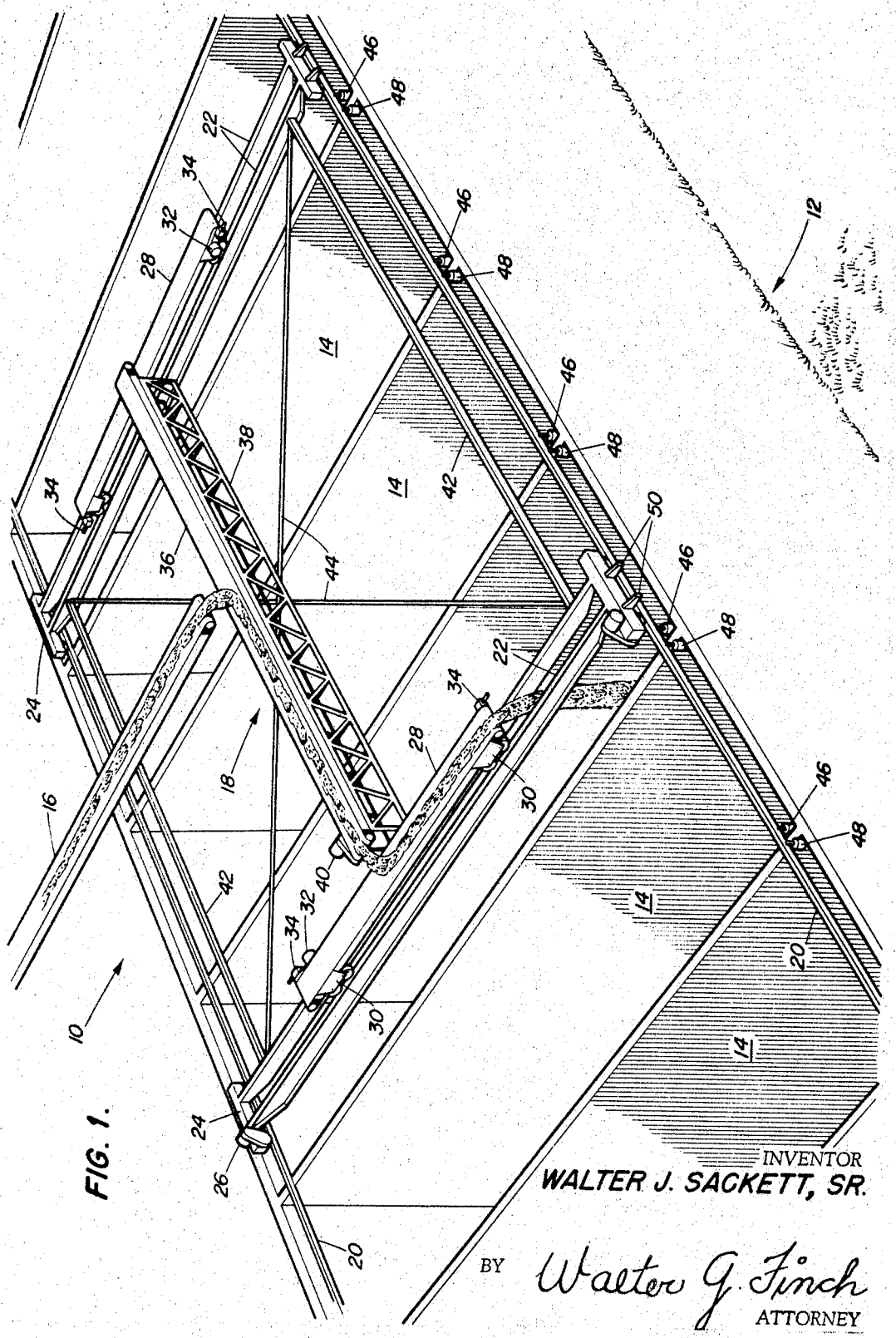

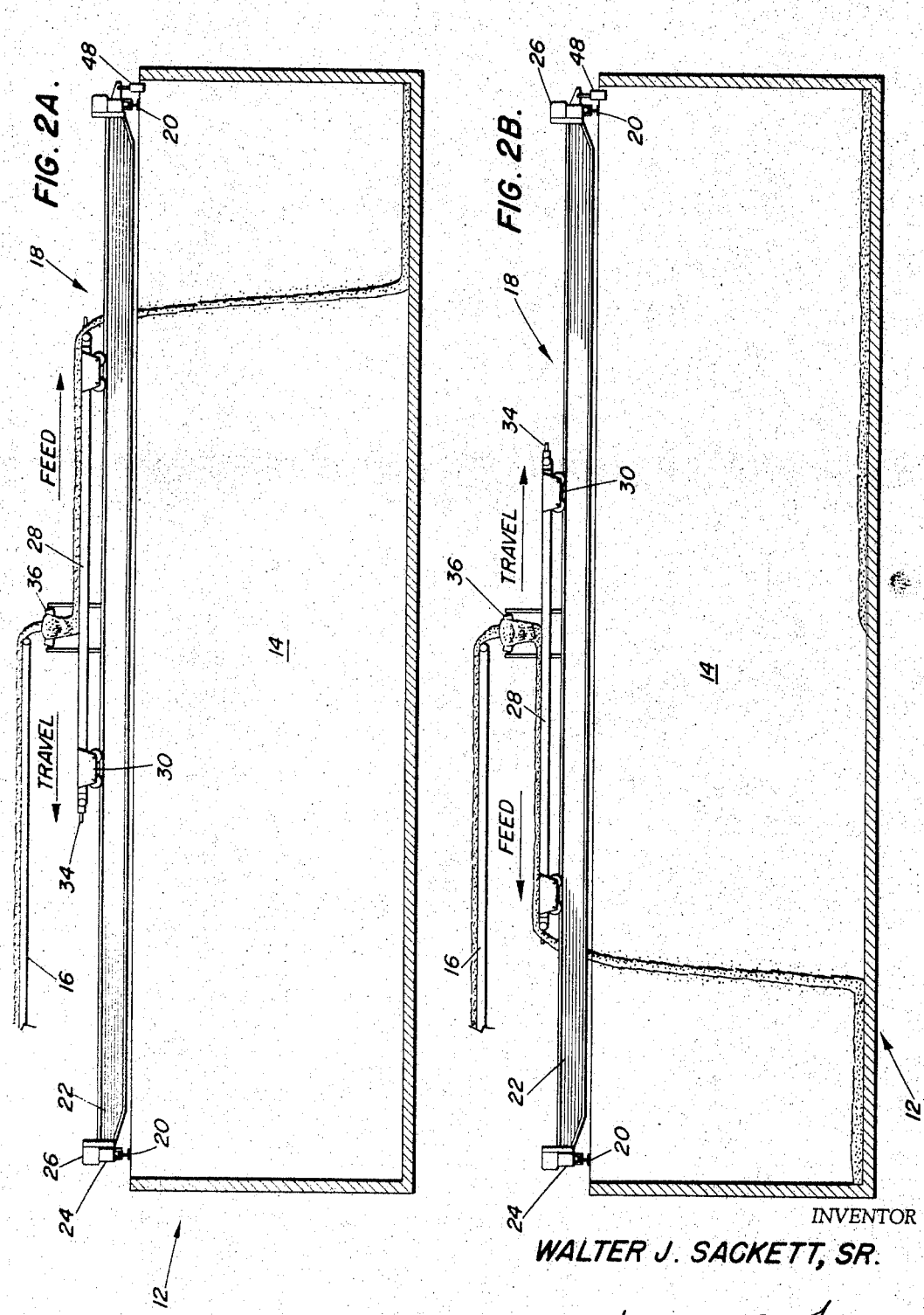

3,435,967
AUTOMATIC LEVEL LOADING SYSTEM FOR BIN STORAGE OF FREE FLOWING MATERIALS
Walter J. Sackett, Sr., 3700 Echodale Ave., Baltimore, Md. 21208
Filed June 23, 1967, Ser. No. 648,335
Int. Cl. B65g 65/32, 37/00; A01f 25/00
U.S. Cl. 214—17                                8 Claims

ABSTRACT OF THE DISCLOSURE

A building for storage of free flowing materials is described which has a bridge type charging conveyor system that travels above rectangular bins and spreads material automatically and with complete, uniform coverage. This is accomplished with crossed traveling conveyors, one feeding the next, and a programmed reversal of both travel and feed direction commanded by limit switches.

---

This invention relates generally to materials storage buildings, and more particularly it pertains to a conveyor arrangement for level filling a group of rectangular storage bins with granular material in a uniformly distributed manner.

A primary object of the present invention is to provide an end-discharging bi-directional belt-type transversely operating and traveling conveyor system.

Another object of this invention is to provide an H-structure traveling conveyor arrangement in which the side members of the H-structure are rails for transverse traveling conveyors of the reversible belt type.

Other objects and attendant advantages of this invention will become more readily apparent and understood from the following detailed specification and accompanying drawings in which:

FIG. 1 is a perspective view of the interior of a bulk storage building for free flowing materials showing a conveyor arrangement incorporating features of this invention;

FIGS. 2A and 2B are vertical sections taken transversely of a bin showing the bi-directional discharge and corresponding bi-directional travel of the transverse conveyor;

Figure 3A:
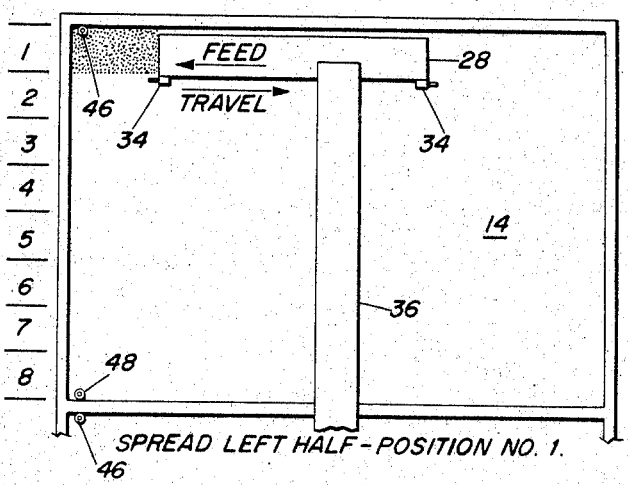
FIGS. 3A, 3B, 3C are diagrammatic plan views of the longitudinal and transverse conveyors with supporting structure omitted showing the successive stages in the spreading of the material while charging a bin.

Referring now to the details of the invention as shown in FIG. 1, reference numeral 10 indicates generally a conveyor arrangement for filling a group of bins 14 of a bulk storage building 12 for free flowing materials.

The bins 14 are rectangular, open-topped structures with common transverse walls. A stationary delivery conveyer 16 extends from an exterior supply source of free flowing material not shown to a point over the longitudinal center line of the group of bins 14.

An H-shaped traveling conveyor system 18 spans several bins 14 and is arranged to travel on rails 20 laid across the series of bins 14 proximate their opposite ends. The side members of the H-shaped conveyor system 18 consists of two spaced pairs of bridge rails 22, each pair secured at their opposite ends on trucks 24.

The crossmember of the H-shaped conveyor system 18 consists of a supporting structure 38 extending from the the center of one pair of rails 22 to the center of the other pair. A longitudinal conveyor 36 is mounted on top of this structure 38 to receive at some point along its surface the free flowing material being discharged from the end of the stationary delivery carrier 16.

To stiffen the conveyor system 18, diagonal cross bracing 44 and longitudinal bracing 44 are used and the conveyor 18 is driven as a whole up and down the rials 20 by drive units 26 in one or more of the trucks 24.

Upon each pair of bridge rails 22, a transverse conveyor 28 is mounted on powered trucks 30. These conveyors 28 are only half the length of the bins 14 but their belt drives 32 are electrically reversible so either end of a conveyor 28 may be made a discharge end as commanded by an opposite end limit switch 34. At this same time, switch 34 stops the powered trucks 30 and, after a delay sufficient to charge the now oppositely moving conveyor 28, the powered trucks 30 are restarted but in a reverse direction. As will be noted from FIGS. 2A and 2B, the travel direction of the transverse conveyors 28 is always opposite to their feed direction.

Only one of the two transverse conveyors 28 is fed at a time from longitudinal conveyor 36. The direction of belt drive 40 is, therefore, set appropriately when the bins 14 to be filled is chosen. In addition, a pair of trigger pins 46 and 48 are extended at this time to define the width of the bin 14 to a pair of bin limit switches 50 which ride one of the trucks 24.

Whenever a switch 50 encounters a trigger pin 46 or 48, the drive unit 26 is reversed thus causing the trucks 24 to reciprocate the system 18 a distance equal to the width of a bin 14 being charged. This motion is accomplished in a series of interrupted steps from one position to another, each occuring during every other delay time previously mentioned during which the power trucks 30 are halted and the transverse conveyor 28 is charging up in reverse.

Figure 3B:
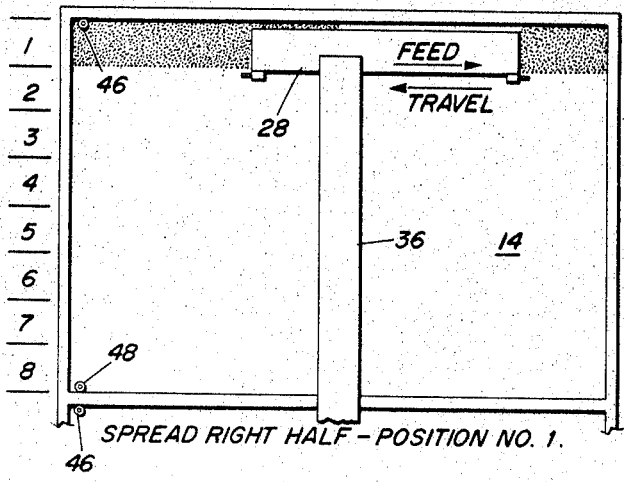
Figure 3C:
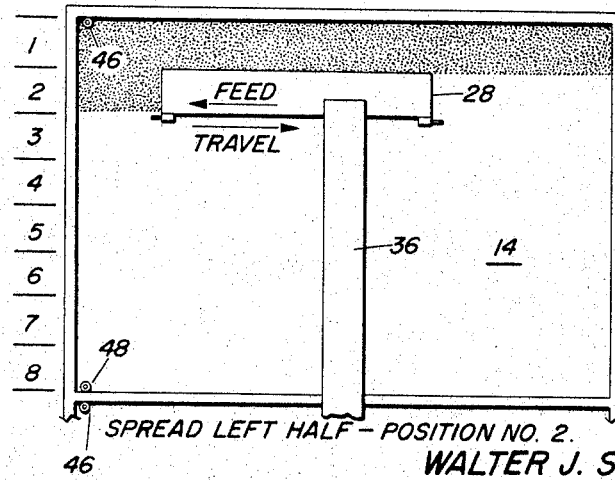
Figure 4:
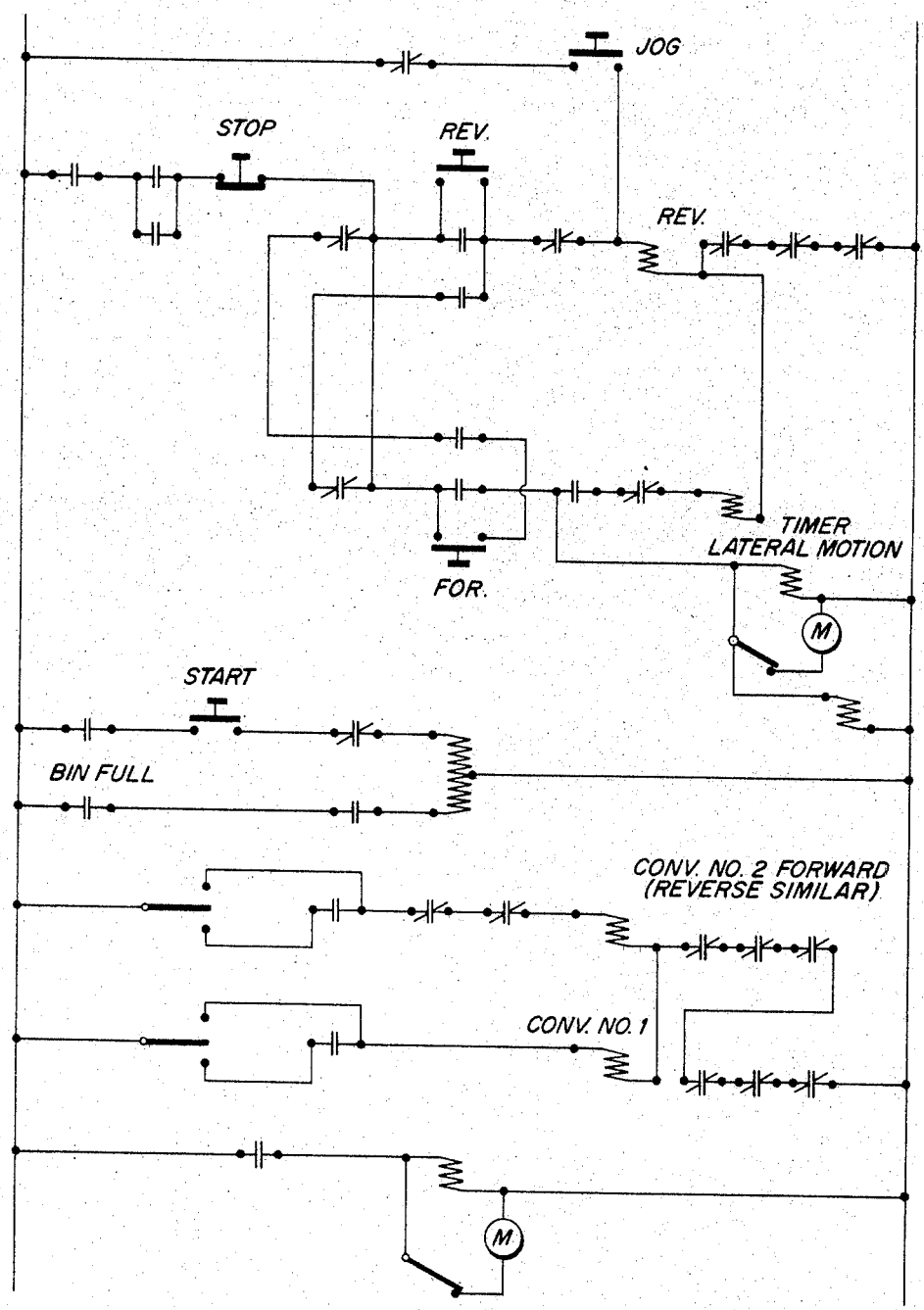
FIG. 4 is a schematic ladder type diagram showing a typical control circuit for automatically operating the conveyor system.

With reference to FIG. 3A, the positions mentioned are numbered 1 to 8 inclusive which correspond to a coverage path of material from end to end of the bin. This path 1 is spread first from the left end to the center of the bin. Then in FIG. 3B, the material is spread from the right end to the center of the bin. At this second reversal of feed and travel (see arrows), the transverse conveyor 28 moves during the delay period to position 2 as shown in FIG. 3C and the above cycle repeats until position 8 is covered whereupon trigger pin 48 reverses the drive units 26 for a sequence of reverse order position scans from 8 to 1.

This continues until a senser (not shown) indicates the bin is filled with free flowing material to a desired level and the action is stopped.

What is claimed is:

1. A conveyer system for distributing free flowing material into a bin, comprising first guide means extending across the width of said bin and thereabove, second guide means mounted to move along said first guide means and extending along the length of said bin, reversible conveyer means mounted to move along said second guide means for distributing said free flowing material along a length portion of said bin as said conveyer means moves along said second guide means, with the operation of said conveyer means being in the direction opposite the movement of said conveyer means along said second guide means, spaced switch means for reversing the direction of movement of said conveyer means at preselected locations, and means responsive to one of said switch means for moving said second guide means a preselected distance along said first guide means, whereby said conveyer means distributes said free flowing material along a different length portion of said bin.

2. The conveyer system of claim 1 wherein said spaced switch means control the discharge of said free flowing material to be from one end of said bin to the middle thereof and then from the opposite end of said bin to the middle thereof.

3. The conveyer system of claim 1 and additionally, means for supplying said free flowing material to said conveyer means during its movement along said second guide means and the movement of the latter along said first guide means.

4. The conveyer system of claim 1 wherein means are provided for halting the movement of said conveyer means at reversal by said spaced switch means until the reversely operating conveyer means is filled with said free flowing material.

5. The conveyer system of claim 4 wherein said responsive means operate during said halting.

6. The conveyer system of claim 1 and additionally, means for reversing the direction of movement of said second guide means along said first guide means at a preselected position along the width of said bin.

7. The conveyer system of claim 6 wherein said reversing means are provided at each extremity of said width whereby said second guide means is moved back and forth over said bin until said bin is filled by said conveyer means.

8. The conveyer system of claim 1 in combination with means for sensing when said bin is filled with said free flowing material.

References Cited

UNITED STATES PATENTS 2,277,416  3/1942  Rutten _____ 217—17

FOREIGN PATENTS 340,767  10/1959  Switzerland.

ROBERT G. SHERIDAN, *Primary Examiner.*

U.S. Cl. X.R.

198—101